United States Patent
Scott et al.

(10) Patent No.: US 9,710,025 B2
(45) Date of Patent: Jul. 18, 2017

(54) DESKTOP RECEPTACLE WITH UTILITY FRONT SURFACE

(71) Applicant: Group Dekko, Inc., Garrett, IN (US)

(72) Inventors: Sean J. Scott, Chicago, IL (US); Jillian Pai, Chicago, IL (US)

(73) Assignee: Group Dekko, Inc., Garrett, IN (US)

( * ) Notice: Subject to any disclaimer, the term of this patent is extended or adjusted under 35 U.S.C. 154(b) by 406 days.

(21) Appl. No.: 14/444,452

(22) Filed: Jul. 28, 2014

(65) Prior Publication Data
US 2016/0022031 A1     Jan. 28, 2016

(51) Int. Cl.
*A47B 37/00*     (2006.01)
*G06F 1/18*      (2006.01)
*A47B 21/06*     (2006.01)

(52) U.S. Cl.
CPC ........ *G06F 1/181* (2013.01); *A47B 2021/066* (2013.01)

(58) Field of Classification Search
CPC ............ A47B 21/00; A47B 2200/0066; A47B 2200/008; A47B 2200/066; H02G 3/081; H02G 3/14
USPC ...... 108/50.01, 50.02, 23; 312/223.6, 223.1; 439/40; 340/538; 362/91; 174/67, 66, 174/50
See application file for complete search history.

(56) References Cited

U.S. PATENT DOCUMENTS

| | | | | |
|---|---|---|---|---|
| 5,008,491 A | * | 4/1991 | Bowman | H02G 3/185 174/489 |
| 5,231,562 A | * | 7/1993 | Pierce | A47B 21/06 108/50.02 |
| 5,457,286 A | * | 10/1995 | Flasz | H02G 3/14 174/66 |
| 5,709,156 A | * | 1/1998 | Gevaert | A47B 21/06 108/26 |
| 6,379,166 B1 | * | 4/2002 | Hagarty | G02B 6/3897 439/134 |
| 6,927,340 B1 | * | 8/2005 | Binder | H02G 3/14 174/66 |
| 8,022,664 B2 | * | 9/2011 | Shu | B25J 19/005 320/107 |
| 2005/0082081 A1 | * | 4/2005 | Marcou | H02G 3/14 174/67 |
| 2006/0231282 A1 | * | 10/2006 | Greenfield | H02G 3/14 174/67 |
| 2007/0022918 A1 | * | 2/2007 | Sweet | A47B 21/06 108/50.02 |
| 2008/0121147 A1 | * | 5/2008 | Cooke | A47B 21/06 108/50.02 |
| 2008/0223601 A1 | * | 9/2008 | Johnson | H02G 3/14 174/67 |
| 2008/0296039 A1 | * | 12/2008 | Dinh | H01R 13/447 174/58 |
| 2009/0014196 A1 | * | 1/2009 | Peck | H02G 3/185 174/54 |
| 2009/0239393 A1 | * | 9/2009 | Shah | H05B 33/0803 439/40 |

(Continued)

*Primary Examiner* — Jose V Chen
(74) *Attorney, Agent, or Firm* — Taylor IP, P.C.

(57) ABSTRACT

A desktop receptacle includes a box with a front surface and a connector surface that has a connector opening formed through, an electrical connection assembly held within the box that has an electrical connector associated with the connector opening, and a utility surface attached to the front surface.

19 Claims, 3 Drawing Sheets

(56) References Cited

U.S. PATENT DOCUMENTS

| | | | | |
|---|---|---|---|---|
| 2010/0078189 A1* | 4/2010 | Leopold | ................... | H02G 3/14 |
| | | | | 174/50.5 |
| 2011/0108303 A1* | 5/2011 | Lank | ........................ | A47G 1/06 |
| | | | | 174/67 |
| 2012/0329292 A1* | 12/2012 | Fish | ................... | H01R 13/6205 |
| | | | | 439/39 |
| 2014/0262418 A1* | 9/2014 | Korcz | .................... | H02G 3/088 |
| | | | | 174/67 |
| 2015/0320203 A1* | 11/2015 | Mandon | ................ | A47B 21/06 |
| | | | | 108/20 |

\* cited by examiner

DESKTOP RECEPTACLE WITH UTILITY FRONT SURFACE

BACKGROUND OF THE INVENTION

1. Field of the Invention

The present invention relates to receptacles, and, more particularly, to desktop receptacles.

2. Description of the Related Art

Desktop receptacles are known that connect electronic devices on a work surface, such as a desk, to electrical and data sources that are remote to the electronic device. Some desktop receptacles have exposed electrical and data connections, which are not aesthetically pleasing. Other desktop receptacles are permanently affixed to the work surface and can't be transferred between different work areas.

What is needed in the art is an aesthetically pleasing desktop receptacle that can be portable.

SUMMARY OF THE INVENTION

The present invention provides a desktop receptacle assembly that can be mounted to a work surface and includes a utility surface that hides electrical connections from being seen and can have functional uses.

The invention in one form is directed to a desktop receptacle that includes a box with a front surface and a connector surface that has a connector opening formed through, an electrical connection assembly held within the box that has an electrical connector associated with the connector opening, and a utility surface attached to the front surface.

The invention in another form is directed to a work area that includes a work surface and a desktop receptacle assembly attached to the work surface. The a desktop receptacle includes a box with a front surface and a connector surface that has a connector opening formed through, an electrical connection assembly held within the box that has an electrical connector associated with the connector opening, and a utility surface attached to the front surface.

An advantage of the present invention is that the utility surface can hide the electrical connection from being seen from a front view of the desktop receptacle, which is aesthetically pleasing.

Another advantage is that the utility surface can be utilized as a functional surface in addition to improving the desktop receptacle's aesthetics.

Yet another advantage is that the desktop receptacle can be portable and easily moved to different work areas if desired.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
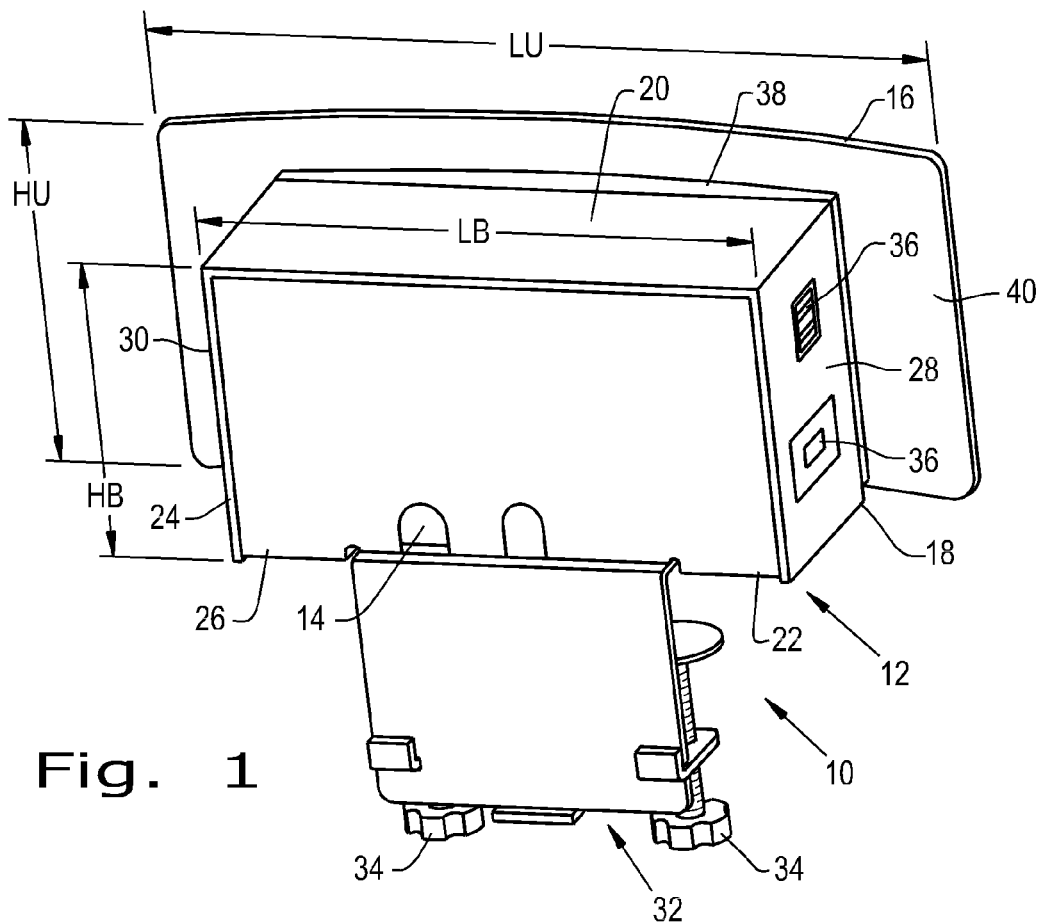
FIG. 1 is a perspective view of an embodiment of the present invention.

Referring now to the drawings, and more particularly to FIG. 1, there is shown a desktop receptacle 10 which generally includes a box 12, an electrical connection assembly 14 held within the box 12, and a utility surface 16 attached to a front surface 18 of the box 12. As can be seen, the box 12 also has a top surface 20, a bottom surface 22, a back surface 24 with a cover 26, and a pair of side surfaces 28, 30. The box 12 is shown as having a generally rectangular shape with flat surfaces 20, 22, 24, 28, 30, but other shapes are also contemplated. The electrical connection assembly 14 is held within the box 12 and the cover 26 on the back surface 24 can hold the assembly 14 within the box 12 as well as protect the assembly 14. The cover 26 is shown as being screwed to the bottom surface 22, but it could be attached to the back surface 22 in other ways. A mount 32 is also attached to the bottom surface 22, which allows for the desktop receptacle 10 to be tightened to a desk or other work surface. The mount 32 has a pair of fasteners 34 that can be advanced toward the bottom surface 22 and can provide a tight grip on a desk surface. Threading (not shown) on the fasteners 34 interact with threading in openings within the mount 32 to allow the fasteners 34 to attach to and detach from the surface. To accommodate the mount 32 and cover 26 attachments, the bottom surface 22 can have a recessed portion for the cover 26 and mount 32 to attach to (shown in FIG. 3), so that the bottom of the desktop receptacle 10 is flush with a surface when its bottom is placed on the surface. The top surface 20 is shown as being flat, which provides a surface to place various items on, if desired. For example, a desk lamp could be placed on the top surface 20 to lighten up the work surface or a holder could be placed on the top surface 20 to hold various office supplies.

Figure 4:
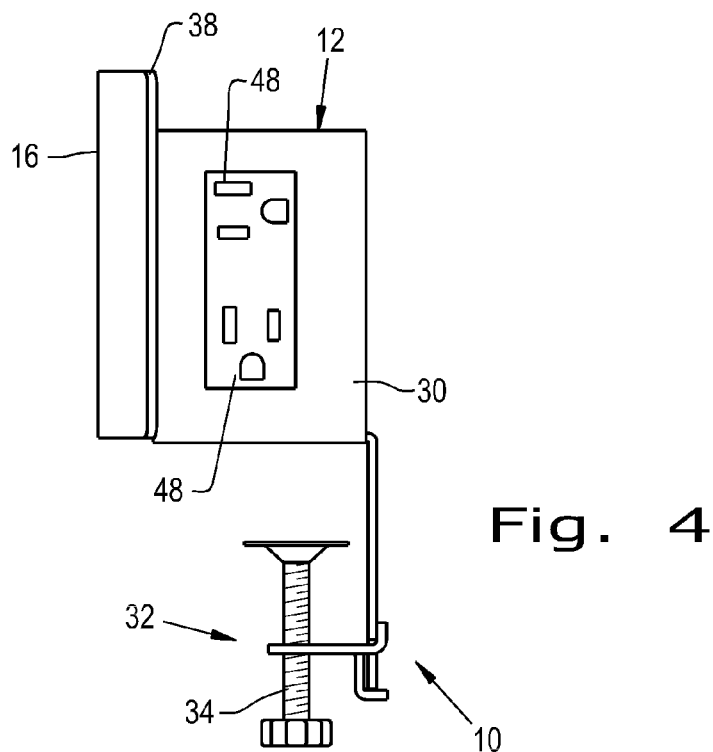
FIG. 4 is a side view of the embodiment shown in FIG. 1.

As shown, each side surface 28, 30 can have one or more connector openings formed through. As can be seen in FIGS. 1 and 4, electrical connectors 36 are associated with the connector openings formed in the side surfaces 28, 30. These electrical connectors 36 are a part of the electrical connection assembly 14 and can provide a power and/or data connection to a plugged in device. While only the side surfaces 28, 30 are shown as having connector openings with associated electrical connectors 36, any of the surfaces 20, 22, 24, 28, 30 could have one or more connector openings formed through with an associated electrical connector 36, and would thus be referred to as a connector surface. Optionally, the surfaces 20, 22, 24, 28, 30 could include features, such as a recess, for housing other components that connect to the electrical connection assembly 14, such as a wireless charging device (not shown). The electrical connection assembly 14 can be any assembly that allows for electricity to be exchanged between an electrical source and an electrical receiver. When a device is plugged into the electrical connector 36 configured as a data port, the sending device will be the electrical source and the receiving device will be the electrical receiver. If the electrical connector 36 is configured as an electrical port, the electrical source will typically be a wall outlet connecting to the electrical grid and the electrical receiver will be the device drawing power from the wall outlet. In this regard, the electrical connectors 36 can be configured as electrical ports for sending bulk electrical power and/or data ports. Examples of data ports can include USB ports, high-definition multimedia (HDMI) ports, component cable ports, video ports and audio ports. These examples are given only to illustrate the types of electrical connectors 36 that can be included and are not meant to be limiting.

A utility surface 16 is attached to the front surface 18 of the box 12. The utility surface 16 is shown as having a curved shape for illustrative purposes, but other shapes could also be chosen. Optionally, the utility surface 16 can have a utility base 38 that connects the utility surface 16 the front surface 18. The utility surface 16 can serve as a shield so that the surfaces 20, 22, 24, 28, 30 of the box 12 can be hidden when the desktop receptacle 10 is viewed from the front. In this regard, the utility surface 16 also hides the electrical connectors 36 associated with openings formed in the surfaces 20, 22, 24, 28, 30. In order to shield the surfaces 20, 22, 24, 28, 30 from view, the utility surface 16 must have at least two viewed dimensions that are larger than corresponding dimensions of the box 12. As can be seen, the utility surface 16 has a utility length LU and a utility height HU that are both larger than corresponding box length LB and box height HB, respectively. The utility surface 16 can be curved so that the side surfaces 28, 30 are better shielded from view at acute angles relative to the front surface 18. This allows for a smaller utility length LU that can still effectively shield the side surfaces 28, 30 from sight, compared to a straight front surface.

The materials used to construct the utility surface 16 can be chosen such that the utility surface 16 can be a functional surface and not just an aesthetic feature. For example, the utility surface 16 can be constructed as a white board, allowing for "dry erase" markers to be used on the utility surface 16. By constructing the utility surface 16 as a white board, the desktop receptacle 10 not only provides an aesthetic attachment for connecting devices to other electrical sources, but can replace other separate items that might be found on an office desk. In addition to being constructed as a white board, the utility surface 16 could also be constructed as a chalkboard, a pin board, and/or a writing board. It is contemplated that the utility surface 16 is coated with a material that provides utility to the surface 16, rather than being completely or mostly constructed out of the material, which can allow for a more economical construction of the utility surface 16. It is also useful if the utility surface 16 is either constructed of a magnetic material or a material that interacts with magnetic materials (ferrite metal). In such a configuration, it is possible to construct the utility surface 16 as a multi-layered surface, with one of the layers being a magnetic material or ferrite metal. Other materials that can be used to form the utility surface 16, in either a single layered or multi-layered construction, include various polymers such as acrylic and wood grain. If the utility surface 16 is attached to the front surface 18 using a utility base 38, the utility base 38 could also be formed of a magnetic material or ferrite metal. It is also contemplated that the utility base 38 is permanently affixed to the front surface 18, while the utility surface 16 can be detached from the utility base 38. For example, the utility base 38 could be formed from a magnetic material and the utility surface 16 could have a back surface 40 made of a ferrite metal that is attracted to the magnetic utility base 38. This would allow for interchangeable utility surfaces 16 to be attached to the desktop receptacle 10, as desired, and also allow for the position of the utility surface 16 to be altered relative to the side surfaces 28, 30 to better shield the side surfaces 28, 30 at different locations on a work surface.

Figure 2:
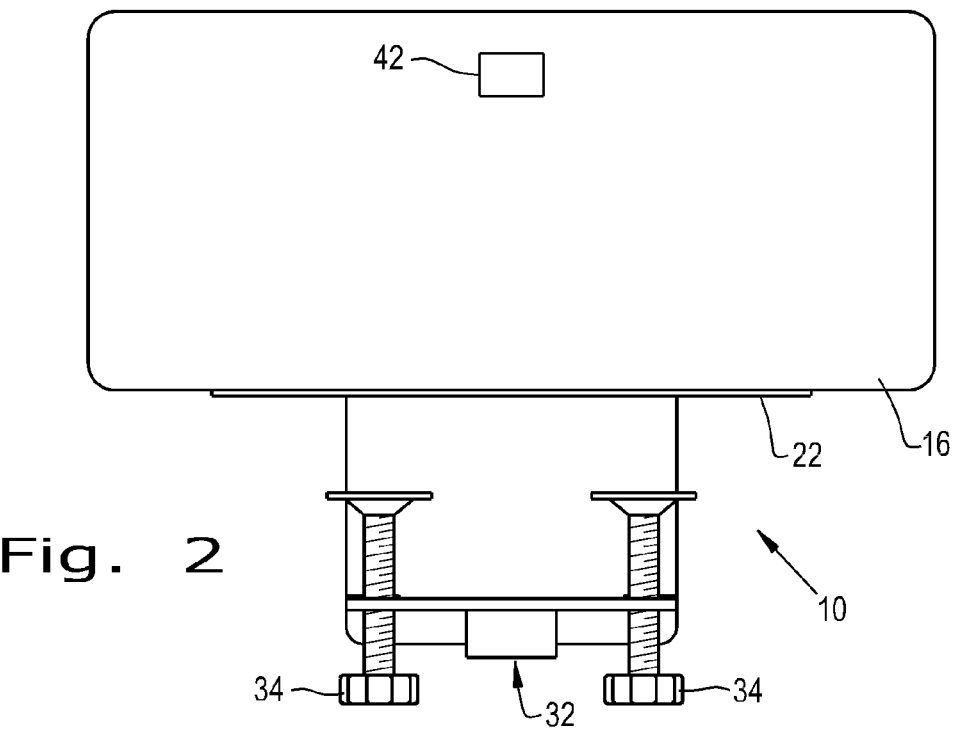
FIG. 2 is a front view of the embodiment shown in FIG. 1.

Referring now to FIG. 2, the desktop receptacle 10 is shown in a front view. The utility surface 16 is blocking the view of the box 12 surfaces 20, 24, 28, 30 so that the electrical connectors 36 cannot be seen from the front. As shown, the bottom surface 22 is slightly visible since it will be the surface that is in contact with the work surface while the desktop receptacle 10 is attached. Since the desktop receptacle 10 will usually have its back surface 24 facing a wall, the utility surface 16 will typically be facing a user when the desktop receptacle 10 is installed. Thus, it can be useful to install a sensor 42 on or within the utility surface 16 that can detect various parameters, such as motion, temperature, ambient light and sound. The sensor 42 can be connected directly to the electrical connection assembly 14 to connect to a power and/or data source, and can communicate with other devices connected to the electrical connector assembly 14. For example, the desktop receptacle 10 could include an installed light (not shown) connected to the electrical connector assembly 14 that automatically turns on when the sensor 42, configured as a motion detector, detects movement which indicates a user has come into close proximity of the desktop receptacle 10. The sensor 42 can have most of its components held within the box 12 with the electrical connection assembly 14. Such features can be tailored to specific users' needs. If desired, the entire sensor 42 could also be held within the box 12 and out of the user's sight altogether.

Figure 3:
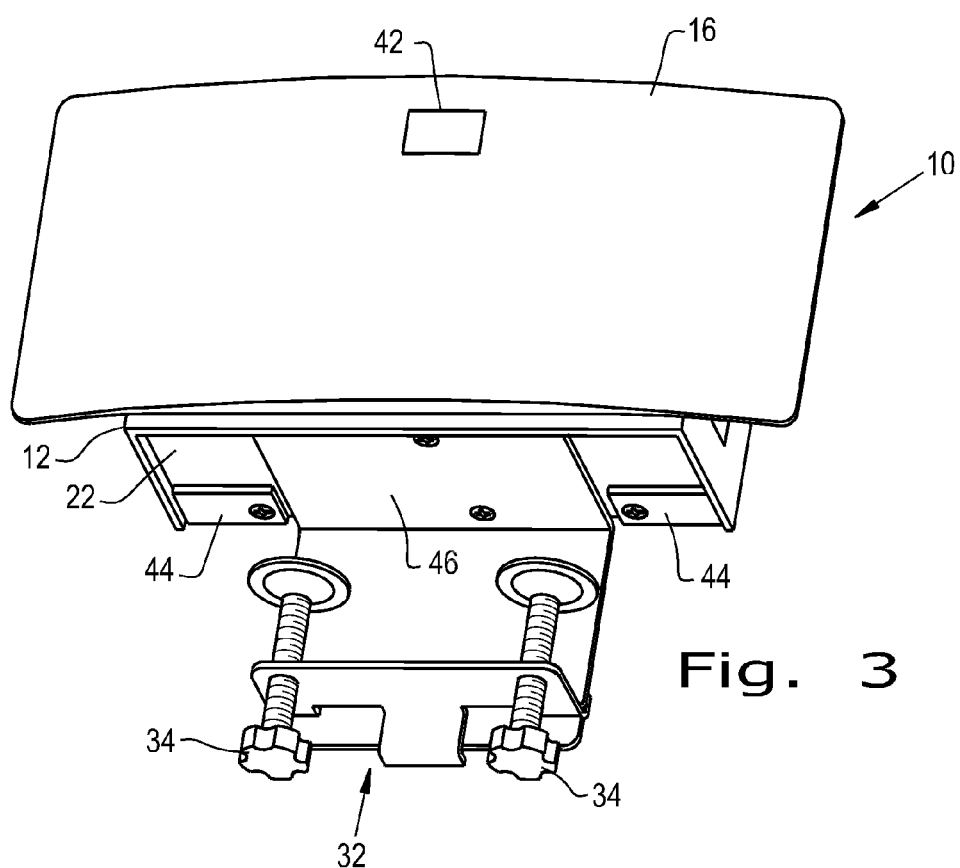
FIG. 3 is another perspective view of the embodiment shown in FIG. 1.

Referring now to FIG. 3, another perspective view of the desktop receptacle 10 is shown that better illustrates the bottom surface 22 and how the cover 26 and mount 32 are attached to the bottom surface 24. As previously described, the bottom surface 22 can have a recessed portion so that portions 44 of the cover 26 and an attachment portion 46 of the mount 32 are not in contact with the surface that the desktop receptacle 10 is attached to. While the mount 32 is shown with a pair of fasteners 34, it is contemplated that the desktop receptacle 10 can be attached to a work surface using any variety of mount.

Referring now to FIG. 4, the desktop receptacle 10 viewed from the side of the side surface 30 is shown. As can be seen, side surface 30 has an opening with electrical connectors 48 associated with the opening. As shown, the electrical connectors 48 are grounded electrical receptacles, but could be any type of electrical and/or data port.

Figure 5:
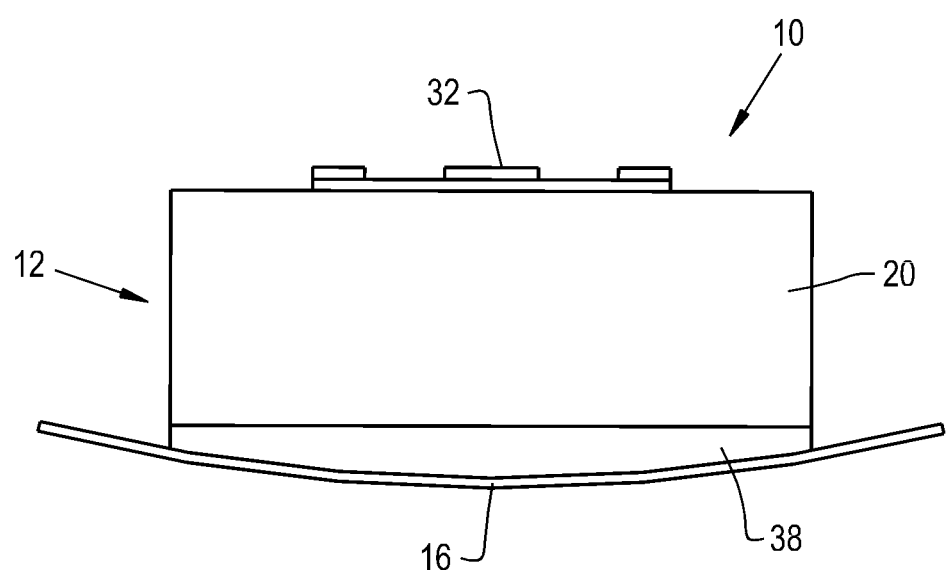
FIG. 5 is a top view of the embodiment shown in FIG. 1.

Referring now to FIG. 5, the desktop receptacle 10 viewed from the top is shown. In this view, the curvature of the illustrated utility surface 16 can be clearly seen. While the utility surface 16 is shown as having a relatively slight curvature, the degree of curvature could be adjusted as desired to produce a desktop receptacle 10 with a different aesthetic look or that has varying amounts of shielding for the side surface 28, 30. Although the utility surface 16 is shown as having a symmetrical curvature, the utility surface 16 could have multiple curvatures to account for varying characteristics of the desktop receptacle's 10 surroundings.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A desktop receptacle, comprising:
   a box having a front surface and a connector surface with a connector opening formed through;
   an electrical connection assembly held within said box, said electrical connection assembly having an electrical connector associated with said connector opening; and
   a utility surface attached to said front surface, said utility surface having a curved shape that follows a radius of curvature and is defined between a pair of opposite longitudinal edges of said utility surface.

2. The desktop receptacle according to claim 1, further including a utility base attaching said utility surface to said front surface.

3. The desktop receptacle according to claim 2, wherein at least one of said utility base and said utility surface is magnetic.

4. The desktop receptacle according to claim 2, wherein at least one of said utility base and said utility surface is composed of a ferrite metal.

5. The desktop receptacle according to claim 2, wherein at least one of said utility base and said utility surface is composed of a polymeric compound material.

6. The desktop receptacle according to claim 1, wherein said utility surface is at least one of comprised of and coated with at least one of a chalkboard material, a white board material, a pin board material, and a writing board material.

7. The desktop receptacle according to claim 1, wherein said utility surface has a utility length and said box has a box length that is less than said utility length.

8. The desktop receptacle according to claim 7, wherein said utility surface has a utility height and said box has a box height that is less than said utility height.

9. The desktop receptacle according to claim 1, wherein said utility surface is configured to be adjustable relative to said front surface.

10. The desktop receptacle according to claim 1, wherein said electrical connector is at least one of an electrical port and a data port.

11. The desktop receptacle according to claim 10, wherein said data port is at least one of a universal serial bus (USB) port, a high-definition multimedia interface (HDMI) port, a component cable port, an Ethernet port, a video port and an audio port.

12. The desktop receptacle according to claim 1, wherein said box includes a top surface, a bottom surface opposed to said top surface and an open back surface opposed to said front surface.

13. The desktop receptacle according to claim 12, further including a mount attached to said bottom surface.

14. The desktop receptacle according to claim 12, further including a cover attached to said back surface.

15. The desktop receptacle according to claim 12, wherein at least one of said top surface and said front surface is configured to house a wireless charging device.

16. The desktop receptacle according to claim 1, further including a sensor connected to said electrical connection assembly.

17. The desktop receptacle according to claim 16, wherein said sensor is at least one of a motion sensor, an ambient light sensor, a temperature sensor, and a sound sensor.

18. The desktop receptacle according to claim 17, wherein said sensor is associated with said utility surface.

19. The desktop receptacle according to claim 1, wherein said box has a pair of side surfaces connected to said front surface and said connector surface is one of said side surfaces.

* * * * *